UNITED STATES PATENT OFFICE.

HEINRICH VOLLBRECHT AND CARL MENSCHING, OF BUFFALO, NEW YORK, ASSIGNORS TO THE SCHOELLKOPF ANILINE AND CHEMICAL COMPANY, OF SAME PLACE.

MANUFACTURE OF COLOR-PRODUCING ACIDS.

SPECIFICATION forming part of Letters Patent No. 333,034, dated December 22, 1885.

Application filed October 3, 1884. Serial No. 144,652. (Specimens.)

*To all whom it may concern:*

Be it known that we, HEINRICH VOLLBRECHT and CARL MENSCHING, both of the city of Buffalo, in the county of Erie and State of New York, have invented a new and useful Improvement in the Manufacture of Color-Producing Acids, of which the following is a specification.

Our invention has the object to produce a new color-producing acid; and it consists of a new naphtholdisulphonic acid, as will be hereinafter described and claimed.

In practicing this invention we mix one hundred parts, by weight, of the lime salt of alphanaphthalinemonosulphonic acid, which acid is made in the well-known manner, with two hundred parts of sulphuric acid of 66° Baumé. We then add to this mixture slowly forty-five parts of nitric acid of 40° Baumé at a temperature of from 90° to 100° centigrade, whereby two new nitromonosulphonic acids are formed. These acids are converted into their amido compounds by any suitable and well-known method, which conversion results in two new naphthylaminesulphonic acids. These last mentioned acids are easily separated, owing to the unequal solubility of their salts in water.

The naphthylaminesulphonic acid, which forms a sodium salt which is not easily soluble in water, is used for producing our new color-producing acid, and is separated from the naphthylaminesulphonic acid which produces a sodium salt easily soluble in water. This naphthylaminesulphonic acid is converted into the diazo compound by a solution of sodium nitrite in the following manner: We dissolve in two thousand parts of water two hundred and forty-five parts of said not-easily-soluble sodium salt of naphthylaminesulphonic acid, and add to this solution two hundred and fifty parts of sulphuric acid of 50° Baumé. We then cool the solution to 6° centigrade, and add slowly a solution containing sixty-nine parts of sodium-nitrite in six hundred and ninety parts of water. While this solution is added the diazo compound is deposited in the form of yellow crystals. The mixture is then allowed to rest for several hours. The diazo compound is introduced into a boiling liquid composed of one thousand parts of water and one hundred and fifty parts of sulphuric acid of 50° Baumé and boiled for several hours, whereby the diazo compound is broken up and a new oxysulphonic acid (naphtholsulphonic acid) is produced. This new alphanaphtholmonosulphonic acid is the raw material for the production of the color-producing naphtholdisulphonic acid.

In producing this naphtholdisulphonic acid we take one part of the above-described naphtholmonosulphonic acid and add to it gradually from two to three parts of sulphuric acid of 66° Baumé. The mass is then heated over a water bath at a temperature of from 80° to 90° centigrade for about one hour, until all the monosulphonic acid is converted into disulphonic acid, which operation is completed when the mass is entirely soluble in water. The whole is then poured into water, and the sodium salt is produced by any well-known method, and may be used directly for producing coloring matter.

Our new naphtholdisulphonic acid is an alpha acid, and shows characteristic differences from all hitherto-known naphtholdisulphonic acids—such, for instance, as the betanaphtholdisulphonic acid described in Letters Patent of the United States No. 210,233, granted November 26, 1878, to H. Baum, which will not form any nitro compounds.

Our new naphtholdisulphonic acid forms, when treated with nitric acid, a beautiful yellow dye-stuff, which consists of a naphtholmononitromonosulphonic acid, and which forms beautiful dye-stuffs with diazo compounds. This new naphtholmononitromonosulphonic acid cannot be confounded with the yellow dye-stuffs produced by Caro and Levinstein, which consists of alphanaphtholdinitromonosulphonic acids, and do not produce dye-stuffs with diazo compounds.

Our new naphtholmononitromonosulphonic acid stands as to shade between the naphthol-yellow made by Caro and Levinstein and the crocein-yellow patented by Bayer.

The former is much greener in shade than our yellow, and the latter is much more reddish and not as brilliant.

We claim as our invention—

As a new article of manufacture, a color-producing acid consisting of the herein-described new naphtholdisulphonic acid, being a derivative of the herein-described naphthylaminesulphonic acid, whose sodium salt is not easily soluble in water, substantially as set forth.

Witness our hands this 30th day of August, 1884.

HEINRICH VOLLBRECHT.
  CARL MENSCHING.

Witnesses:
 C. F. GEYER,
 JNO. J. BONNER.